United States Patent
Hentschel et al.

(10) Patent No.: US 7,111,831 B2
(45) Date of Patent: Sep. 26, 2006

(54) SOUND ATTENUATION APPARATUS AND METHOD

(75) Inventors: Gregory P. Hentschel, Overland Park, KS (US); Robert F. Beltz, Oak Grove, MO (US); Jidong Yang, Overland Park, KS (US); Eldon F. Mockry, Lenexa, KS (US)

(73) Assignee: Marley Colling Technologies, Inc., Overland Park, KS (US)

( * ) Notice: Subject to any disclaimer, the term of this patent is extended or adjusted under 35 U.S.C. 154(b) by 0 days.

(21) Appl. No.: 10/259,407

(22) Filed: Sep. 30, 2002

(65) Prior Publication Data

US 2004/0060769 A1   Apr. 1, 2004

(51) Int. Cl.
*F16K 47/02* (2006.01)
*F01N 7/00* (2006.01)
*B01F 3/04* (2006.01)

(52) U.S. Cl. .............................. 261/110; 261/DIG. 11; 181/224; 181/233; 181/234

(58) Field of Classification Search ............... 181/224, 181/225, 229, 232, 210, 214, 218, 264, 268, 181/270, 275, 283, 233, 234; 261/110, 30, 261/112.1, 111, 112.2, DIG. 11; 55/440
See application file for complete search history.

(56) References Cited

U.S. PATENT DOCUMENTS

| | | | | |
|---|---|---|---|---|
| 3,081,987 A | * | 3/1963 | Meek et al. ............. 261/112.2 |
| 3,807,145 A | * | 4/1974 | Engalitcheff et al. ........ 96/357 |
| 3,870,485 A | * | 3/1975 | Shiraishi et al. ............... 96/357 |
| 4,218,408 A | * | 8/1980 | Henning et al. ......... 261/112.2 |
| 4,269,796 A | * | 5/1981 | Glicksman et al. ...... 261/112.2 |
| 4,328,176 A | * | 5/1982 | Alt et al. ..................... 261/111 |
| 4,333,749 A | | 6/1982 | Holmberg et al. ............ 55/257 |
| 4,459,244 A | * | 7/1984 | Norback ................... 261/112.2 |
| 4,521,350 A | * | 6/1985 | Lefevre ...................... 261/111 |
| 4,543,108 A | * | 9/1985 | Wurz ........................... 95/272 |
| 4,622,183 A | * | 11/1986 | Sonnenschein et al. ..... 261/110 |
| 5,028,356 A | * | 7/1991 | Wiltz ........................... 261/109 |
| 5,124,086 A | * | 6/1992 | Schultz .................... 261/112.2 |
| 5,147,583 A | * | 9/1992 | Bugler et al. ............ 261/112.2 |
| 5,663,536 A | | 9/1997 | Kaplan ......................... 181/224 |
| 5,958,306 A | * | 9/1999 | Curtis ........................ 261/30 |
| 6,663,694 B1 | * | 12/2003 | Hubbard et al. .............. 95/288 |

FOREIGN PATENT DOCUMENTS

| | | |
|---|---|---|
| CN | ZL00240571.7 | 9/2001 |
| DE | 3437729 C1 * | 4/1986 |
| JP | 10220972 A * | 8/1998 |

OTHER PUBLICATIONS

Enkamat® Colbond, P.O. Box 1057, Enka, NC 28728.

* cited by examiner

*Primary Examiner*—P. Austin Bradley
*Assistant Examiner*—Eduardo Colon Santana

(57) ABSTRACT

A cooling tower sound attenuation apparatus having at least one sheet. The sheet has an upper and lower end and a first substantially straight region and a second region that is connected to the first substantially straight region. The apparatus additionally has a liquid collection basin along with a support structure that supports the sheet such that the lower end of the sheet is proximate to the liquid collection basin.

10 Claims, 5 Drawing Sheets

PRIOR ART

SOUND ATTENUATION APPARATUS AND METHOD

FIELD OF THE INVENTION

The present invention relates generally to a method and apparatus for the attenuation of sound in a cooling tower. More particularly, the present invention relates to a method and apparatus for attenuating the sound of a cooling tower during operation by reducing the momentum of the heat transfer water as it falls from the heat transfer media into the water basin of the cooling tower.

BACKGROUND OF THE INVENTION

Cooling towers are devices that cool process fluid for power plants, process fluid and cooling water for HVAC, for example. Hot process fluid, usually water, is cooled by passing cold ambient air over the hot fluid. The fluid is then cooled by evaporation and/or direct contact with the air. Pumps deliver the process fluid to the tower and in most cases, the process fluid flows by gravity from an elevation inside the cooling tower downwards to the "cold water" basin (usually at the tower base). As the fluid travels downward through the tower, it passes through various types of media that release the fluid into droplets as the fluid continues its path to the bottom of the tower.

During operation, cooling towers generally produce unwanted noise. There are many sources of this noise. These sources include: mechanical devices such as the fan and fan motor, the water from the spray system and general splashing of water over heat transfer media and into the basin, and the air gusting through the cooling tower. Of the sources described above, the falling water is typically a primary contributor to cooling tower noise, especially at ground level near the cooling tower.

As the noise is generated, it is emitted through the air intake and the air outlet of the cooling tower. This noise generated by the cooling tower can be a deterrent to the utilization of a cooling tower in a given application.

There are two primary types of cooling towers used today, counterflow and crossflow. Counterflow towers have become the industry accepted "standard" for large field-erected cooling towers because they generally cost less and consume less footprint area than a comparable crossflow tower. In a counterflow cooling tower, the water passes over the heat transfer media and is cooled by the air as it moves downward. At the bottom of the heat transfer media, the water simply falls unimpeded into the cold water basin below; splashing into the water contained therein, producing noise. In most counterflow towers, the heat transfer media is raised above the operating water level of the cold water basin in order to allow ambient air to enter the tower. As a result of the above-described orientation, this produces a noticeable increase in droplet momentum thereby increasing the amplitude of the noise as it impacts the water surface of the water basin, transferring the energy from the falling fluid droplet to a sound wave as its decent is abruptly halted.

The typical sound level of the noise associated with an operational cooling tower is around 70 dBA at a horizontal distance of 50 feet from the louvered face of the tower. Due to the aforementioned cooling tower operational noise levels, one in every eight field erected counterflow cooling towers, requires some sort of inlet sound attenuation.

Current methods for attenuating noise include slowing the fan or altering the design of the fan with the implementation of variable speed drives and blocking and/or muffling water noise after it has already been created. Slowing and/or modifying the fan gives the cooling tower different cooling properties, is very expensive, and is not applicable in many applications.

With respect to blocking and/or muffling water noise after it is created, there are two primary methods currently employed in the industry. These methods, however, are difficult to maintain, inhibit tower performance, are extremely costly, and/or require the use of large obtrusive walls that can not always be accommodated at the project site.

The first method involves placing a barrier around the cooling tower. One way to do this is to build a wall around the tower or at least around the source of the noise. However, the utilization of a sound barrier is very limited because it is based on the configuration of the project site and any barrier to sound is also a barrier to the air circulation, reducing the effectiveness of the tower. In addition, space is often a premium on a construction site and the ability to build walls around the cooling structures may not be feasible.

The second method involves insulating the side-walls of the cooling tower to prevent the emission of the noise from the tower on a particular side or sides. The use of insulated walls is not possible on the air-entering wall or walls. The object of the cooling tower is to allow air to circulate and cool the water and restricting the circulation of the air is undesirable because it tends to frustrate a central purpose of the cooling tower. To compensate for closing off one or more faces of the air inlet, the tower height and more specifically the air inlet height must increase. Thus, tower framing and the height of the insulated walls are increased which increase costs. Additionally the pumping head is increased which increases operating costs. Furthermore, the falling water height is increased which often results in more noise emitted on the open faces of the tower.

A variation of insulted walls is the use of baffled attenuators. Baffles are aligned across the face of the air inlet with gaps between the baffles to permit air to enter the tower. One or more rows of these baffles may be employed. When two or more rows of insulated baffles are employed, they may be arranged in a staggered pattern to prevent unimpeded sound wave portions from traveling straight out of the air inlet faces. Unlike solid insulated walls, air is permitted to traverse around the baffles and enter the tower. Although, attempts have been made at aerodynamic shaped baffles, this method suffers from air flow pressure loss around the baffles which requires more power to overcome or the loss of thermal performance. By increasing the air inlet height these disadvantages can be overcome at least in part, but the taller attenuation baffles suffer from the same disadvantages as increasing the height of the insulated walls.

Another method attempts to reduce the noise by affecting the falling water, and involves the utilization of droplet interceptors. Water droplets strike the interceptors before being released to the free water surface below. The current droplet interceptors available on the market are made of thick mesh or wood slats sloped at an angle. The thick mesh is problematic because over time it tends to clog, prohibiting water from passing through and enabling biological organisms to grow, creating water treatment issues. In addition, because the mesh is supported by a thin wire "net", the mesh will tend to sag over time and fall out of the wire "net", allowing at least some of the falling water to splash unattenuated.

Unlike the mesh, the wood slat material is relatively inexpensive. However the labor involved in installing the wood slats is more expensive than for the mesh. In addition the wood slats are not very effective as a sound attenuation media, in some instances, the slats may actually contribute to the noise of the tower.

Accordingly, it is desirable to provide a sound attenuation method and apparatus that offers a substantial reduction in noise, is relatively inexpensive, maintenance free and avoids restricting the circulation of air within the cooling tower. It is also desirable to provide a noise attenuation structure that is stable, low cost and resists and corrosion.

SUMMARY OF THE INVENTION

The foregoing needs are met, at least in part, by the present invention where, in one aspect, a sound attenuation apparatus is provided for use with a cooling tower having cooling liquid which falls in a generally downward direction along a vertical axis into a collection basin. The sound attenuation apparatus includes at least one film sheet having an upper end and a lower end, wherein the sheet has a first region with a first surface at a first angle to the vertical axis. The apparatus additionally includes a support structure that supports the film sheet such that the lower end is above the liquid collection basin.

In accordance with another embodiment of the present invention, a sound attenuation apparatus is provided for use with a cooling tower having cooling liquid which falls in a generally downward direction along a vertical axis into a collection basin. The apparatus includes a means for receiving falling liquid droplets and reducing the momentum of the falling liquid droplets along with a means for supporting the receiving and reducing means above the liquid collection.

In accordance with another embodiment of the present invention, a sound attenuation apparatus for a cooling tower having a vertical axis and an orthogonal axis is provided having at least one sheet. The sheet includes a plurality of vertical wave shaped corrugations. Each wave shaped corrugation has an upper, straight portion at an angle to the vertical axis along with a wave shaped portion.

In accordance with still another embodiment of the present invention, a sound attenuation apparatus for a cooling tower having a vertical axis and an orthogonal axis is provided having at least one sheet. The sheet includes a plurality of fluted cross corrugations that intersect one another and are oriented at an angle with respect to the orthogonal axis.

In accordance with yet another embodiment of the present invention, a sound attenuation apparatus for a cooling tower having a vertical axis and an orthogonal axis is provided having at least one sheet. The sheet includes a plurality of corrugations. Each corrugation includes an upper, fluted portion at an angle to the vertical axis and a cross fluted portion integrally connected to upper fluted portion. The cross fluted portion has intersecting fluted corrugations that are oriented at an angle to the orthogonal axis.

In accordance with still another embodiment of the present invention, a sound attenuation apparatus for a cooling tower having a cooling fluid which falls in a generally downward direction along a vertical axis into a collection basin is provided. The sound attenuation apparatus includes a plurality of film sheets and each film sheet is elongated in a first direction and stacked in a second direction. The film sheets are also curved along the second direction.

In another aspect of the present invention, a method for attenuating sound from a cooling tower having a vertical axis and a liquid collection basin for falling liquid is provided, comprising the steps of: providing at least one film sheet above the basin in the path of the falling liquid; receiving the falling liquid as droplets onto a surface of the film sheet; and reducing the momentum of falling water droplets by contact of substantially all of the droplets with the surface of the film sheet.

DETAILED DESCRIPTION OF PREFERRED EMBODIMENTS OF INVENTION

Figure 1:
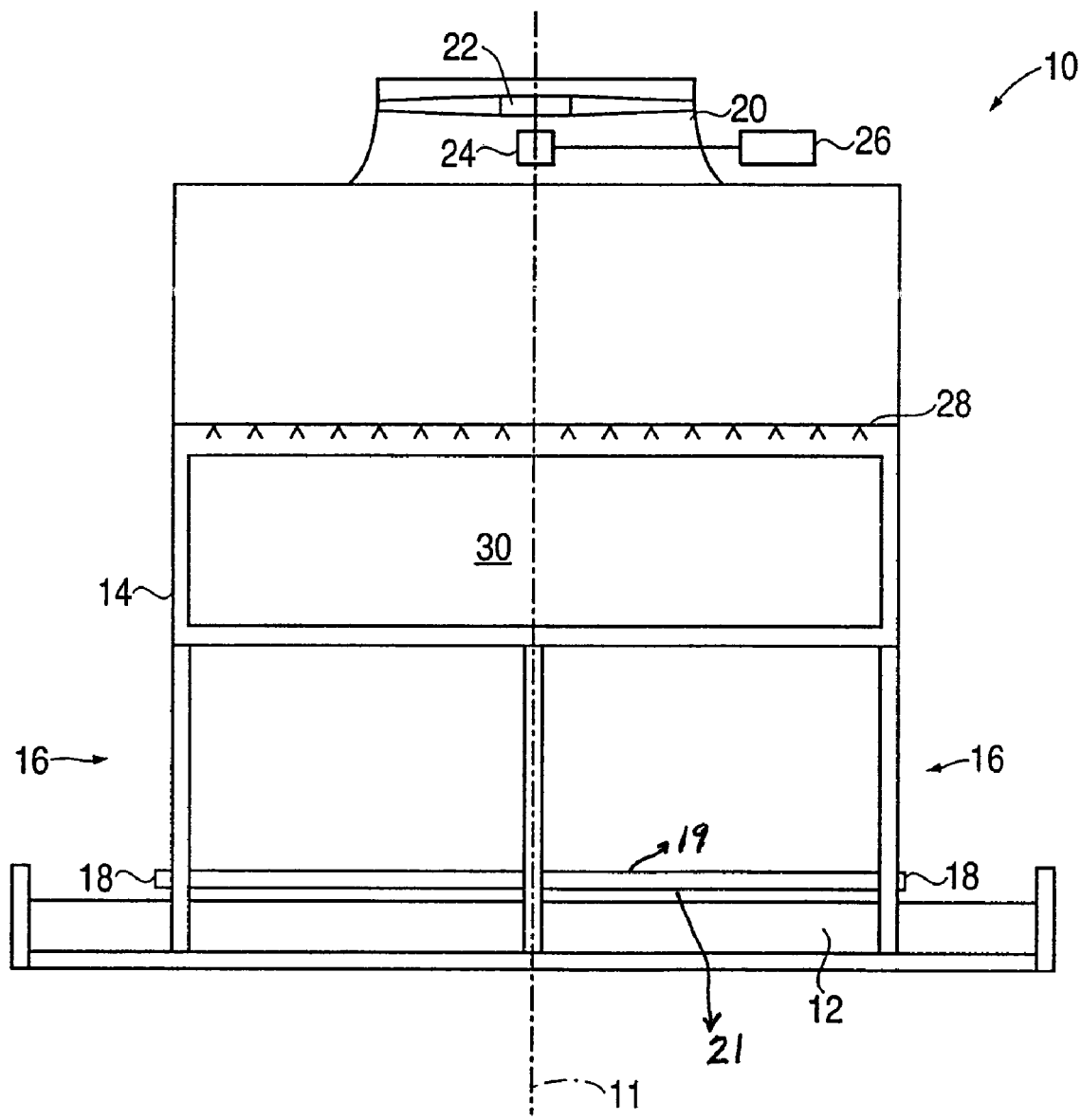
FIG. 1 is a schematic side view of a counterflow water cooling tower employing a sound attenuation apparatus in accordance with an embodiment of the present invention.

Referring now to the figures wherein like reference numerals indicate like elements, FIGS. 1–7 illustrate the presently preferred embodiments of a water cooling tower sound attenuation apparatus. While in the embodiments depicted the sound attenuation apparatus is used in conjunction with a counterflow cooling tower, it should be understood that the present invention is not limited in its application to counterflow cooling towers, and can be used for other types of cooling towers and/or heating towers.

It should be understood that the structures shown throughout the figures and described herein are representative examples of embodiments in accordance with the present invention utilized in a conventional mechanical draft counterflow cooling tower. The invention is not limited to use with cooling towers and can be used in alternative heat exchange apparatuses such as heating towers.

A conventional mechanical draft counterflow cooling tower is depicted schematically in FIG. 1 and designated by the numeral 10. The cooling tower has a vertical axis 11 and an orthogonal axis and includes a cold water basin 12, framing structure generally designated 14 having air inlets 16 on at least two sides thereof and also includes a sound attenuation apparatus 18 located immediately above the water basin 12. The sound attenuation apparatus 18 has an upper end 19 and a lower end 23. The cooling tower further includes a fan stack 20 within which a fan blade assembly 22 rotates. The blade assembly 22 is driven by a gear structure 24 and mounted motor 26.

A series of hot water distributors 28 in the form of spray nozzles or the like are located beneath the blade assembly 22. The heat transfer media 30 or "fill" is situated directly under the hot water distributors 28 and directly above the air inlets 16, sound attenuation apparatus 18 and the water basin 12.

Figure 2:
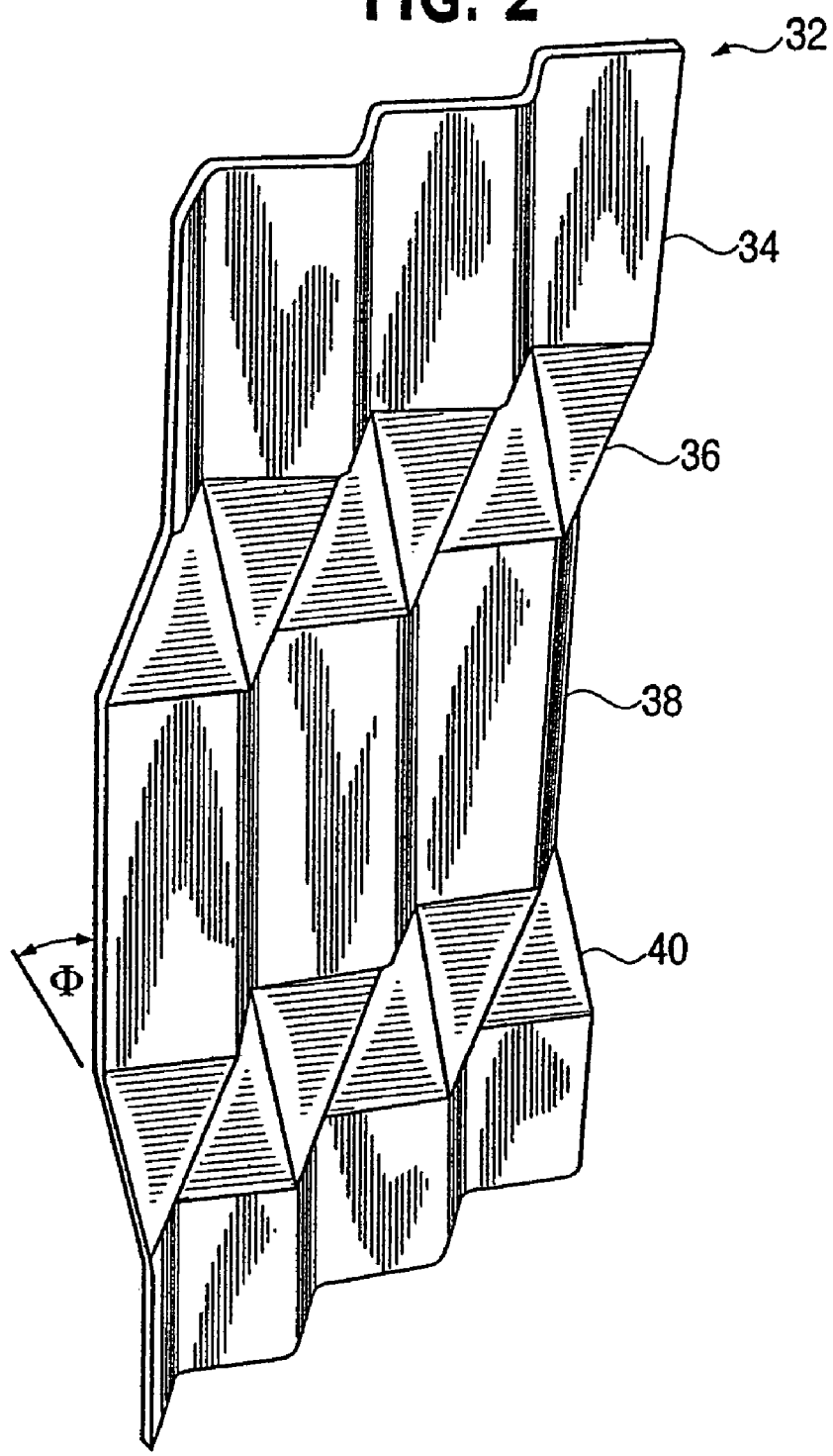
FIG. 2 is a perspective view of a splash attenuation sheet used in accordance with an embodiment of the present invention.
Figure 3:
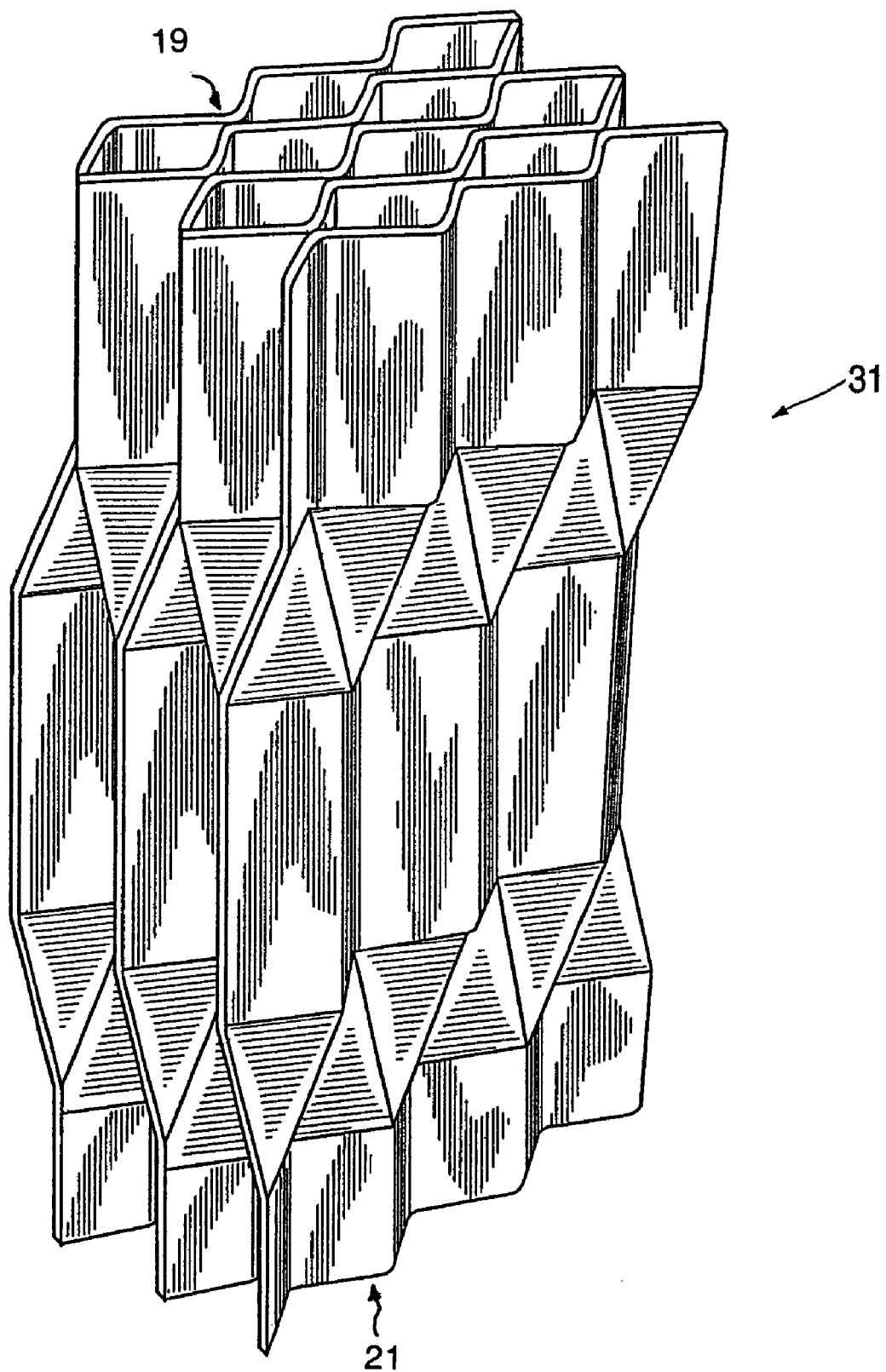
FIG. 3 is a perspective view of splash attenuation media pack employing a plurality of the splash attenuation sheets depicted in FIG. 1.

As is apparent from FIGS. 2 and 3, the sound attenuation apparatus 18 is preferably composed of multiple fill packs 31, each having an upper end 19 and a lower end 21. Each of these fill packs 31 is preferably composed of a series of upright, individual synthetic resin sheets 32 which are joined together in a parallel, side-by-side relationship as depicted in FIG. 3. The sheets 32 are preferably vacuum formed to present undulations, depressions and/or projections in the surface thereof, as will be hereinafter described in detail. Alternatively, the sheets 32 may be formed by various other methods known in the art.

The sheets 32 and sound attenuation apparatus 18 are supported by designated portions of the cooling tower framing structure 14 located beneath the cooling tower fill 30. These designated portions are preferably a plurality of horizontally disposed and spaced cross members (not pictured) located above the water basin 12. The aforementioned cross members may include longitudinal girts and longitudinal stringers that are located on top of the transverse girts of the cooling tower frame assembly.

The sound attenuation apparatus 18 is positioned as close to the operating water level of the water basin 12 as possible. Preferably, the apparatus 18 is positioned such that the distance between lower end of the apparatus 18 and the operating water level of the basin 12 is no greater than 12 inches. More preferably, this distance is no more than approximately 6 inches. Most preferably, this distance is approximately zero inches. The aforementioned distance may vary however distances greater than 12 inches may be substantial enough to produce an undesirable level of noise. Additionally this distance may actually be less than zero with the lower end of apparatus 18 being submerged. Obviously the upper end of apparatus 18 can not be submerged as that would create a free water surface for droplets to impact and generate noise.

Referring now to FIGS. 2 and 3, as previously mentioned, the sound attenuation apparatus 18 is made up of a series of upright synthetic resin sheets 32 in a side-by-side orientation. Each sheet is preferably formed from a vacuum formed resin panel that is preferably from 15 mils to 25 mils in thickness. The panel thickness can vary depending upon cooling tower size and dimensions, however the synthetic resin panel must be of sufficient thickness that it will withstand elevated temperatures encountered within the cooling tower 10 without significant deformation during use of the attenuation apparatus 18.

For descriptive purposes, only a portion of the resin sheets 32 for each embodiment of the present invention will be described in detail, although it is to be understood that the sizes of the sheets 32 and the orientation of the sheet regions may vary.

In the embodiment depicted in FIGS. 2 and 3, the sheet 32 includes an upper corrugated and/or fluted region 34 that is integral with a transition region 36 therebelow followed by a second corrugated and/or fluted region 38 that is integral with a second transitional region 40 therebelow. Alternative embodiments covered by the present invention may include additional fluted and transitional regions or fewer such regions depending on cooling tower application and size. Furthermore, the previously described orientation of the fluted and transitional regions is not required for the apparatus 18 to function properly and for example, combinations may be employed wherein multiple transition regions 36, 40 may be positioned adjacent to one another.

The resin sheets 32 that combine to form the sound attenuation apparatus 18 are preferably vertically positioned along the vertical axis 11 of the water cooling tower 10. This positioning enables the upper fluted portions 34 of the resin sheets 32 to have a water impact angle from about 0° to about 10°. Preferably, this angle is approximately 0°. The falling liquid descends in a generally downward direction along the vertical axis 11 of the cooling tower and upon exiting the fill 30, the liquid free falls until in impacts the attenuation apparatus 18. By water impact angle it is understood that the impact surface of the sound attenuation apparatus 18 is situated at an angle to the liquid or water falling through the cooling tower. Thus, the upper fluted portions 34 of the resin sheets 32 are preferably at an angle to the vertical axis of the tower that is from about 0° to about 10°.

The 0° water impact angle is preferred because all water impacts generate noise and contribute to the overall noise production of the cooling tower. The quicker the deceleration and/or the larger the water droplet mass, the more noise that is generated. Thus, the 0° impact angle between water droplet and the upper fluted region 34 of the sheets 32 will produce the least amount of sound while enabling the water droplets to film onto the individual resin sheets 32. The aforementioned orientation between the falling water droplets and the resin sheets 32 is important at the top of the attenuation apparatus 18 because any sound produced at this location will immediately travel to the air inlets 16 at near full intensity and exit the cooling tower.

The upper fluted portions 34 additionally function to allow the remaining droplets, droplets that do not immediately film upon impact with the sound attenuation apparatus 18, to pass into the sheets 32 a substantial distance before impacting the first transitional region 36. This design enables the individual resin sheets that form the apparatus 18 to shield or block the tower air inlets 16 from the sound produced by the droplet impact on the transitional region 36. This design, in effect, creates miniature barrier walls around the droplets that fall through the upper fluted regions 34 and strike the transitional regions 36. The upper fluted portions 34 preferably are greater than 1 inch in length in order to allow proper penetration of the water droplets and block the impact sound of the droplets when they contact the transition region 36 as previously described. The upper fluted portion length can be of any length, with greater length, providing better sound attenuation, but for practical purposes about 2 feet is the maximum, with typical installations preferably about 2 inches.

The individual resin sheets 32 are preferably connected to one another so that the sound attenuation apparatus 18 is sight tight, however, sightness is not required for the apparatus to function properly. By sight tight it is understood that if one were to attempt to look vertically through the sound attenuation apparatus 18, he or she could not look through and view the other side. Due to this sight tightness, a water droplet falling vertically from the fill 30 can not continue to fall unimpeded through the sound attenuation apparatus 18 and splash in the water basin 12.

As depicted in FIGS. 2 and 3, the resin sheets preferably include transition regions 36, 40 that are integral with the fluted regions 34, 38. The transition regions 36, 40 include a series of corrugations which protrude at an angle $\Phi$ of about 0° to about 30° to the vertical axis 11 of the cooling tower 10. Preferably, the corrugations are each essentially triangular in outline.

The transition regions 36, 40 function to slow down the momentum of the droplets that do not immediately film onto the resin sheets 32, as previously discussed, prohibiting the droplets from directly impacting the water in the water basin 12. The more gradual the slope from vertical, i.e., the slower the deceleration, the lower the sound levels produced within the sound attenuation device 18. Alternatively, the transition regions may include various designs and geometries and are not limited to the triangular outline described, for example, hyperbolic paraboliod. As a result of the combination of the fluted regions 34, 38 and the transition regions 36, the noise of the water impacting the fill basin is significantly reduced, reducing the overall sound generated by the cooling tower during operation.

Figure 4:
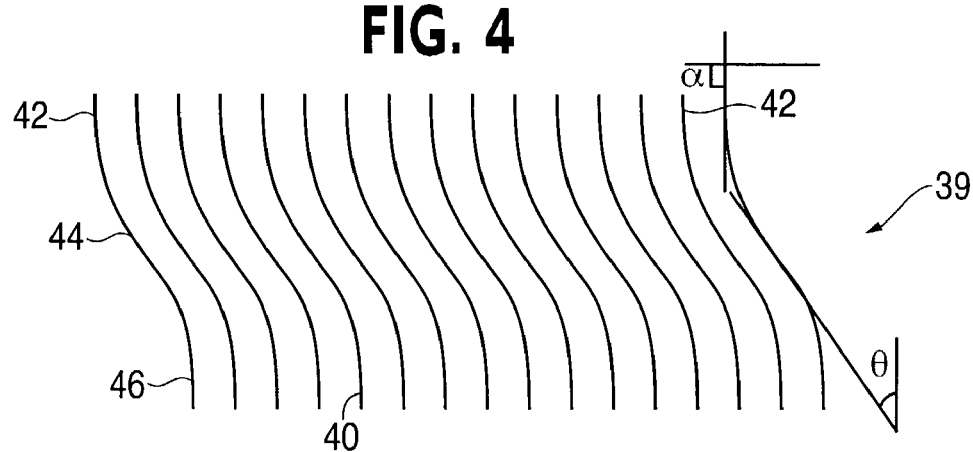
FIG. 4 is a diagrammatic representation of an individual splash attenuation sheet in accordance with an embodiment of the present invention.

Referring now to FIG. 4, an alternative embodiment of a resin sheet 39 in accordance with the present invention is diagrammatically illustrated. This embodiment employs wave-like corrugations 40 on the resin sheet 39. Each sheet 39 includes an upper, vertical portion 42 followed by an integral wave or transition region 44, followed by another vertical portion 46. As discussed with the previous embodiment depicted in FIGS. 2 and 3, the vertical portions 42, 46 are preferably oriented at angle $\alpha$ of about 0° to about 10° to the vertical axis 11 of the cooling tower 10. The direction referred to as the vertical axis 11 of the tower 10 is typically the vertical direction, and the direction of the falling water in operation. The wave region 44 preferably has tangents $\theta$ that are at angle from about 45° to about 90° to the vertical axis 11 of the cooling tower. More preferably, the tangents are at an angle $\theta$ from about 60° to about 90° to the vertical axis. As previously described in the prior embodiment, attenuation apparatuses employing the resin sheets 39 with wave corrugations 40 can be sight tight.

Figure 5:
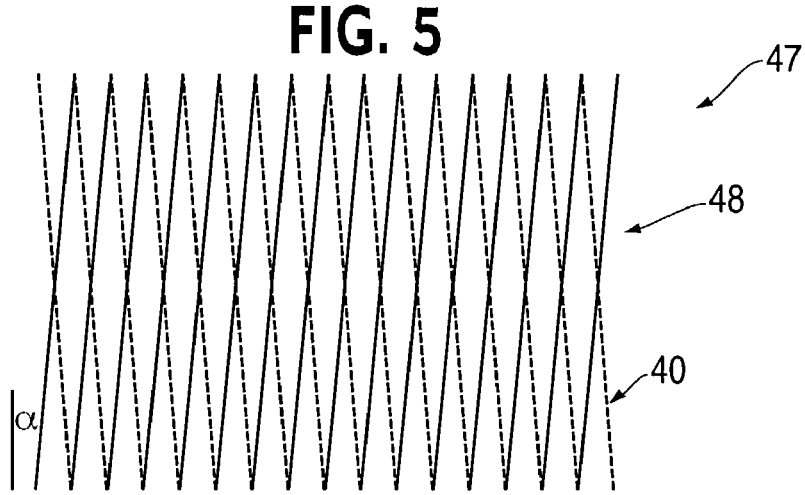
FIG. 5 is a diagrammatic representation of an individual splash attenuation sheet in accordance with another embodiment of the present invention.

FIG. 5 diagrammatically depicts an alternative embodiment of a resin sheet 47 in accordance with the present invention. This embodiment employs cross-corrugated packing 48 with flute angles $\alpha$ from about 0° to about 15° to the vertical axis 11 of the tower. The dotted and solid lines represent the projection of the flutes or corrugations from the resin sheet. In this example, the solid lines represent flutes or corrugations that are projecting towards the reader while the dotted lines represent flutes or corrugations that are projecting away from the reader.

In this embodiment, the slope of the corrugations 40 is sufficiently steep enough that when a water droplet contacts the surface of the resin sheet, the water droplet maintains momentum over a short distance until it films, as previously described, reducing the sound emitted.

Figure 6:
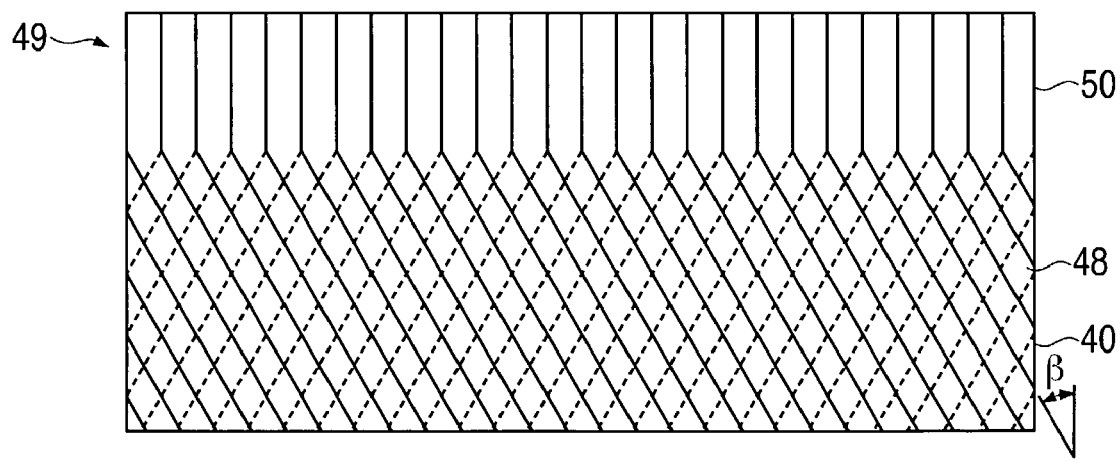
FIG. 6 is a diagrammatic representation of an individual splash attenuation sheet in accordance with another embodiment of the present invention.

FIG. 6 diagrammatically depicts resin sheet 49 in accordance with yet another embodiment of the present invention. The resin sheet 49 is similar to that illustrated in FIG. 5, utilizing cross-corrugated packing 48, however this embodiment has the addition of integral vertical flutes 50 located at the top of the sheet. The addition of the vertical flutes 50 allows for the cross-corrugations 40 to be at a steeper angle $\beta$ with reference to the vertical axis of the tower. This arrangement provides more intersection points of the corrugations 40, which strengthens the individual packs 31 that make up the attenuation apparatus 18, and also allows the packs 31 to span further. For example, the angle $\beta$ may range from approximately 30° to approximately 60°, with 45° being the optimum angle for providing the most intersection points.

Figure 7:
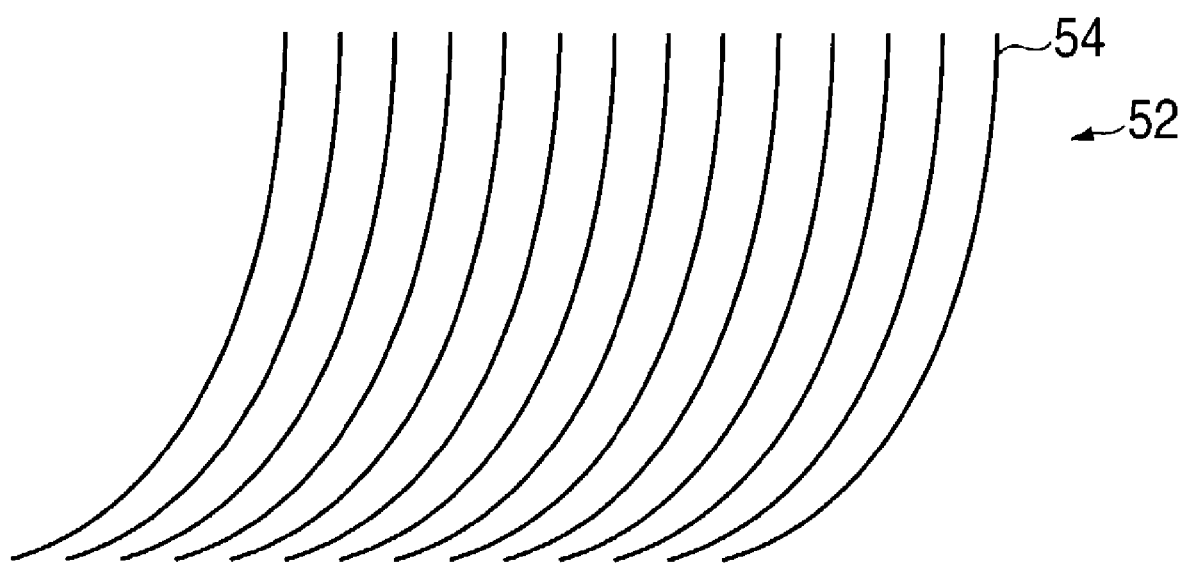
FIG. 7 is a side view of a plurality of splash attenuation sheets in accordance with another embodiment of the present invention.

Referring now to FIG. 7, an alternate configuration of the embodiment depicted in FIGS. 2 and 3 is illustrated. This embodiment 52 utilizes an infinitely or continuously variable curvature. This configuration is a preferred geometry because the upper, vertical portion 54 of the resin sheets has preferably a 0° impact angle with the falling water droplets while the curvature and spacing of the sheets 18 function to stop droplets that failed to immediately film onto the sheets from free falling into the water basin 12. The curvature and spacing of these sheets may be adjusted to more closely match the water loading, droplet momentum and trajectory of droplets of the cooling tower. As discussed with the previous embodiments, these sheets are preferably situated relatively close above the operating water level of the water basin 12.

All of the above-identified embodiments may be used in combination with fibrous or woven media, for example, Enkamat®, that further enhances the performance of the sound attenuation apparatus 18. When utilizing one of the aforementioned materials, it is preferably placed over the top of the attenuation apparatus and functions to decrease the momentum of the water and further break it into finer droplets before entering the attenuation apparatus 18, providing increased sound attenuation.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A sound attenuation apparatus for a heat exchange tower having heat exchange fluid which falls in a generally downward direction along a vertical axis into a collection basin, comprising:

a heat transfer media positioned at a first vertical height along the vertical axis;

at least one sound attenuation fill pack having an upper end and a lower end, wherein said at least one sound reduction fill pack comprises a plurality of film sheets, each of said sheet having a fist region at the upper end with a first surface at a first angle substantially equal to 0° to the vertical axis direction, wherein said at least one sound attenuation fill pack is positioned as a second vertical height along the vertical axis below said first vertical height, wherein each of said plurality of sheets is connected to one another so that said at least one sound attenuation fill pack is sight tight; and a support structure that supports said at least one sound attenuation fill pack, wherein said lower end of said at least one sound attenuation fill pack is positioned above the liquid collection basin, wherein said at least one sound attenuation fill pack is utilized in combination with said heat transfer media and wherein said at least one sound attenuation fill pack is positioned between the heat transfer media and the liquid collection basin along the vertical axis so that a vertical space exists between said heat transfer media and said at least one sound attenuation fill pack; and wherein said plurality of film sheets each comprises a second region having a second surface joining said first surface and at a second angle to the vertical axis different from the first angle, a third region joining the second region having a third surface and a third angle to the vertical axis different from the second angle, a fourth region joining the third region and having a fourth surface and at a fourth angle to the vertical axis different from the third angle. and a fifth region joining the fourth region having a fifth surface and at a fifth angle to the vertical axis different from the fourth angle.

2. The sound attenuation apparatus according to claim 1, wherein said first region includes a first plurality of corrugations at the first angle to the vertical axis.

3. The sound attenuation apparatus according to claim 2, wherein said plurality of corrugations are fluted.

4. The sound attenuation apparatus according to claim 2, wherein said second region has a second plurality of corrugations at a second angle to the vertical axis different from the first angle.

5. The sound attenuation apparatus according to claim 4, wherein said second plurality of corrugations are fluted.

6. The sound attenuation apparatus according to claim 2, wherein the second angle is approximately less than or equal to 45°.

7. The sound attenuation apparatus according to claim 1, wherein said third and said fifth region each include a third and fifth plurality of corrugations, respectively.

8. The sound attenuation apparatus according to claim 7, wherein said third and fifth plurality of corrugations are each substantially triangular in outline.

9. The sound attenuation apparatus according to claim 1, wherein each film sheet is elongated in a first direction and stacked in a second direction, wherein the second region is also curved along the second direction.

10. A method for attenuating sound from a heat exchange tower having a vertical axis, heat transfer media positioned at a first vertical height along the vertical axis and a liquid collection basin for falling liquid, comprising:

providing at least one sound attenuation fill pack having an upper end and a lower end, wherein said at least one sound attenuation fill pack comprises a plurality of film sheets each having a first region at the upper end with a first surface at a first angle substantially equal to 0° to the vertical axis direction, wherein said at least one sound attenuation fill pack is positioned as a second vertical height along the vertical axis below said vertical height, in the path of the falling liquid, wherein each of said plurality of sheets is connected to one another so that said at least one sound attenuation fill pack is sight tight;

receiving the falling liquid as droplets onto a surface of the at least one sound attenuation fill pack; and reducing the momentum of falling water droplets by contact of substantially all of the droplets with the surface of the at least one sound attenuation fill pack, wherein a vertical space exists between said heat transfer media and said at least sound attenuation fill pack; and wherein said plurality of film sheets each comprises a second region having a second surface joining said first surface and at a second angle to the vertical axis different from the first angle, a third region joining the second region having a third surface and a third angle to the vertical axis different from the second angle, a fourth region joining the third region and having a fourth surface and at a fourth angle to the vertical axis different from the third angle, and a fifth region joining the fourth region having a fifth surface and at a fifth angle to the vertical axis different from the fourth angle.

* * * * *

UNITED STATES PATENT AND TRADEMARK OFFICE
CERTIFICATE OF CORRECTION

| | | |
|---|---|---|
| PATENT NO. | : 7,111,831 B2 | Page 1 of 1 |
| APPLICATION NO. | : 10/259407 | |
| DATED | : September 26, 2006 | |
| INVENTOR(S) | : Gregory P. Hentschel et al. | |

It is certified that error appears in the above-identified patent and that said Letters Patent is hereby corrected as shown below:

On Title Page:
Item (75), Inventors

Please replace "Robert F. Beltz" with --Robert E. Beltz--;

Item (73), Assignee

Please replace "Marley Colling Technologies, Inc." with --Marley Cooling Technologies, Inc.--;

In the Specification:
Column 8, Line 65

Please replace "third angle." with --third angle,--.

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,111,831 B2  Page 1 of 1
APPLICATION NO. : 10/259407
DATED : September 26, 2006
INVENTOR(S) : Gregory P. Hentschel et al.

It is certified that error appears in the above-identified patent and that said Letters Patent is hereby corrected as shown below:

Claim 1, Column 8, line 38, please replace "fist" with --first--.

Signed and Sealed this

Twenty-ninth Day of May, 2007

JON W. DUDAS
*Director of the United States Patent and Trademark Office*